(No Model.)

A. A. STEVENSON.
PROCESS OF MAKING WROUGHT METAL WHEELS.

No. 531,072.  Patented Dec. 18, 1894.

Witnesses:
Charles Le Cow
Fred C. Benner

Inventor:
Archy A. Stevenson
by his Attorneys
Howson & Howson

UNITED STATES PATENT OFFICE.

ARCHY A. STEVENSON, OF BURNHAM, PENNSYLVANIA.

PROCESS OF MAKING WROUGHT-METAL WHEELS.

SPECIFICATION forming part of Letters Patent No. 531,072, dated December 18, 1894.

Application filed March 6, 1894. Serial No. 502,499. (No model.)

*To all whom it may concern:*

Be it known that I, ARCHY A. STEVENSON, a citizen of the United States, and a resident of Burnham, Mifflin county, Pennsylvania, have invented a certain Process of Making Wrought-Metal Wheels, of which the following is a specification.

The object of my invention is to cheaply manufacture wrought metal plate wheels which are made up of a number of parts assembled and welded together forming a unitary structure.

Figure 1:
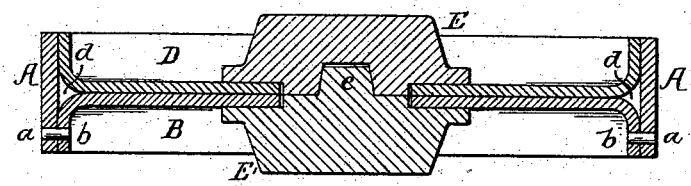
Figure 2:
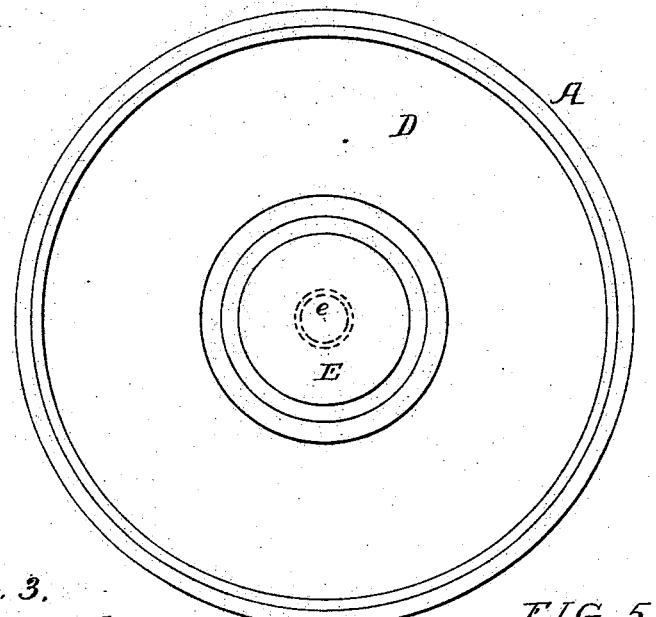
Figure 3:
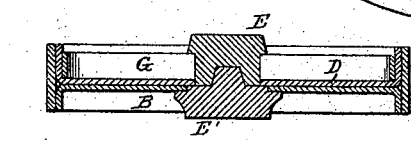
Figure 5:
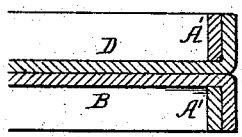
Figure 4:
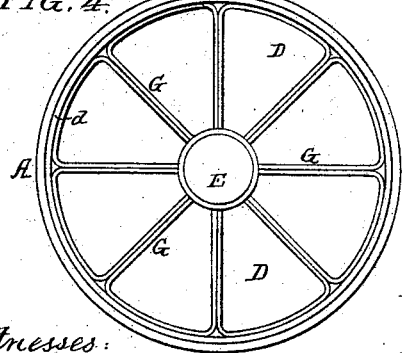
Figure 6:
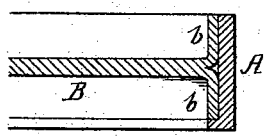
Figure 7:

In the accompanying drawings:—Figure 1, is a sectional view of an assembled wheel illustrating my invention as applied to a central plate wheel. Fig. 2, is a plan view of the wheel shown in Fig. 1. Fig. 3, is a sectional view of a wheel in which are combined the plates and spokes. Fig. 4, is a plan view of the wheel shown in Fig. 3. Figs. 5 and 6, are views of modifications of my invention. Fig. 7, is a sectional view of one form of ring.

Referring in the first instance to Figs. 1 and 2, A is the ring or tire within which the parts are assembled. B is a flanged plate, the flange $b$ being turned down so as to fit within the ring A and secured to said ring in any suitable manner. I have shown in the drawings pins $a$ passing through the ring and rim, but a rib may be formed on the ring as shown in Fig. 6, thus dispensing with the pins. Upon the plate B is placed the flanged plate D with the flange up. This plate is a duplicate of the plate B and fits snugly within the ring A. The plate may be made thick and split at the edge and flanged above and below, as shown in Fig. 6, thus dispensing with one plate. The hub is made in halves E E'. As the hub is thicker than the rest of the wheel I heat the two sections of the hub before heating all the assembled parts, and in order to secure the two parts together and to the plates B and D, in the present instance I form on one part a tapered projection $e$ and in the other part a tapered recess so that when the two parts are heated and placed together with the plates in position a slight pressure will make one section adhere to the other section, thus dispensing with bolts or other expensive fittings. When the parts are assembled with the heated hub, the structure is placed in the heating furnace and after being heated to the proper welding point it is placed between suitably shaped dies and formed into a unitary structure.

Scraps or pieces of metal may be placed in the annular space $d$ between the two flanged plates and the rim or a bar rolled to shape and bent to proper diameter may be inserted if necessary. If desired the outer ring A may be rolled with an annular fin as shown in Fig. 7, thus doing away with extra pieces.

In Figs. 3 and 4, I have shown a wheel in which the two plates B and D are used and in which the spokes G are also used. This construction is especially adapted for wheels requiring great strength and in some instances the spokes may be arranged on both sides of the plate or plates. The ring A may be made in two parts, as shown in Fig. 5, the parts A', A' being placed within the flanges of the plates B and D so as to give the desired thickness to the rim of the wheel.

While my invention is especially adapted for car wheels it will be understood that it can be used for wheel centers, pulleys, traction wheels and gear wheels and when used as a wheel center the tire can be shrunk on or otherwise secured to the center.

I claim as my invention—

1. The process herein described of making wrought metal wheels or wheel centers, said process consisting in flanging and perforating a plate, making a ring section adapted to the flange of the plate and making two hub sections, having means for uniting one with the other when heated, separately heating the hub sections, assembling the flanged plate and ring, securing the heated hub sections together and to the plate, then heating the composite structure to a welding heat and finally subjecting it to the action of dies whereby it is welded into a solid mass, substantially as described.

2. The process herein described of making wrought metal wheels consisting in first forming a ring, second flanging a plate and making the central perforation therein, third securing said plate within the ring, fourth making another flanged plate and mounting it on the first flanged plate, fifth making the two hub sections, one having a projection adapted to a recess in the other, uniting said
5 hub sections together and to the plate and heating the assembled parts and forging the same, substantially as described.

In testimony whereof I have signed my name to this specification in the presence of two subscribing witnesses.

ARCHY A. STEVENSON.

Witnesses:
 J. IRA MUSSER,
 R. T. HUGHES.